United States Patent [19]

Sakane et al.

[11] 4,333,716
[45] Jun. 8, 1982

[54] FOCUS DETECTION SYSTEM

[75] Inventors: Toshio Sakane, Yokohama; Kazuya Hosoe, Machida; Tokuichi Tsunekawa, Yokohama; Takao Kinoshita, Tokyo; Takashi Kawabata, Kamakura, all of Japan

[73] Assignee: Canon Kabushiki Kaisha, Tokyo, Japan

[21] Appl. No.: 98,514

[22] Filed: Nov. 29, 1979

[30] Foreign Application Priority Data

Dec. 4, 1978 [JP] Japan ................. 53-150379

[51] Int. Cl.³ ............................................. G03B 7/099
[52] U.S. Cl. .................................... 354/25; 250/201; 250/209; 352/140; 358/227
[58] Field of Search ........................ 354/25, 195, 198; 350/46, 47; 250/201, 209; 352/140; 355/55, 56; 353/76; 358/227

[56] References Cited

U.S. PATENT DOCUMENTS

| | | | |
|---|---|---|---|
| 2,831,057 | 4/1958 | Orthuber | 178/7.2 |
| 2,838,600 | 6/1958 | Salinger | 178/7.2 |
| 3,532,045 | 10/1970 | Genähr | 95/45 |
| 3,764,213 | 10/1973 | O'Meara | 250/204 |
| 3,896,304 | 7/1975 | Aoki et al. | 250/201 |
| 4,183,642 | 1/1980 | Fukuoka | 354/25 |

FOREIGN PATENT DOCUMENTS

| | | |
|---|---|---|
| 43-10265 | 4/1968 | Japan . |
| 46-34063 | 10/1971 | Japan . |
| 49-22890 | 2/1974 | Japan . |
| 53-79425 | 7/1978 | Japan . |
| 53-79531 | 7/1978 | Japan . |

*Primary Examiner*—L. T. Hix
*Assistant Examiner*—Stafford D. Schreyer
*Attorney, Agent, or Firm*—Toren, McGeady & Stanger

[57] ABSTRACT

Disclosed is a focus detecting system in which first and second signals corresponding to image forming states at first and second positions each almost at the same distance before and behind a predetermined focal plane of an image forming optical system are obtained. A third signal corresponding to an image forming state at a third position different from the first and the second positions is also obtained. The in-focus state of the image formed by the image forming optical system is detected on the basis of a first comparison signal obtained by comparing the first and the second signals with each other, a second comparison signal obtained by comparing the first and the third signals with each other and a third comparison signal obtained by comparing the second and the third signals with each other.

39 Claims, 14 Drawing Figures

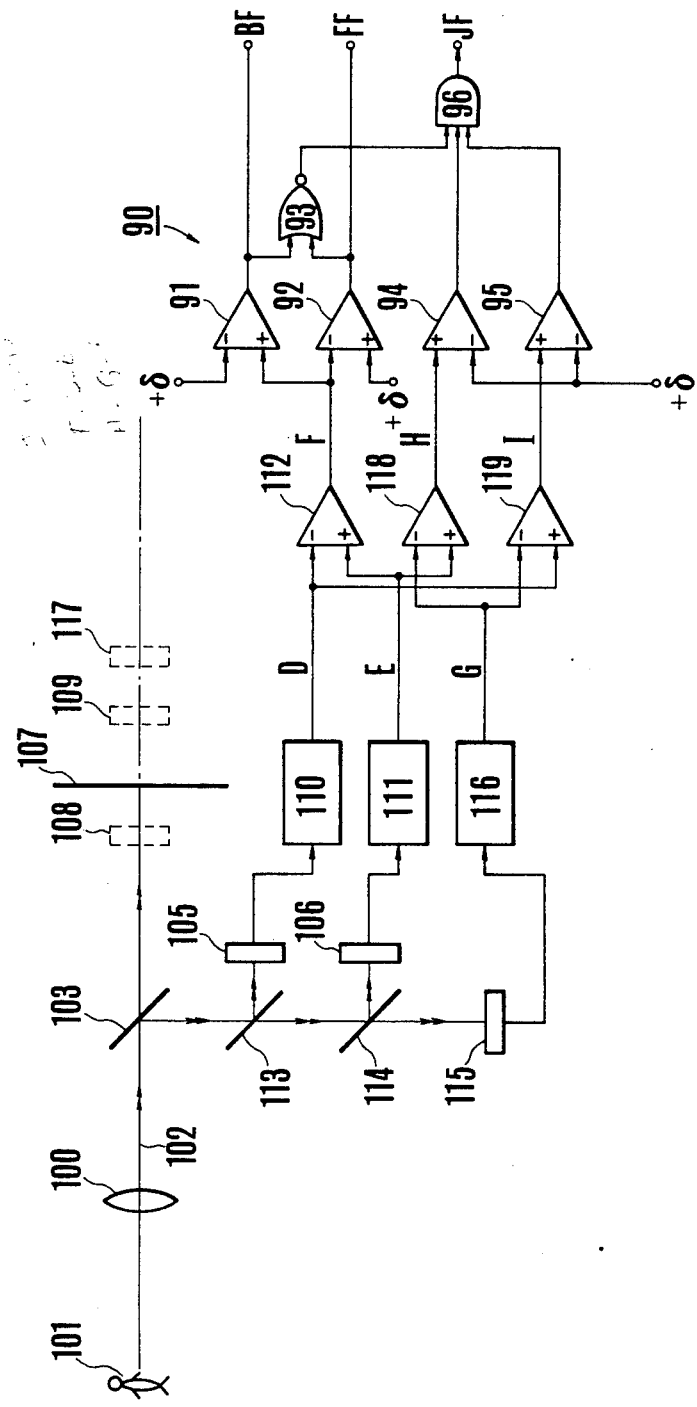
F I G. 3

FOCUS DETECTION SYSTEM

BACKGROUND OF THE INVENTION

1. Field of the Invention

The present invention relates to a focus detecting system, more particularly, one in which two signals corresponding to the image forming states at two positions almost at the same distance before and behind a predetermined focal plane of an image forming optical system, on which plane the object image is to be formed, are obtained. Further, the focus adjusting state of the image forming optical system for the object, particularly, not only to discriminate the in-focus state from the out-of-focus state but also the direction of the out-of-focus state, namely, the so-called near-focus state and the far-focus state, is detected by comparing the above two signals.

2. Description of the Prior Art

Until now, many methods as well as devices for carrying out focus detection by estimating the sharpness of the image formed by the image forming optical system have been proposed. Among them, there is a method in accordance with which, at two positions almost at the same distance before and behind the predetermined focal plane of the image forming optical system photoelectric, elements having characteristics for producing different outputs in correspondence with the variation of the image sharpness are respectively arranged. The difference between the outputs of the two photo-electric elements being used so that the in-focus state is considered to have been obtained when the difference is zero at the time of adjusting the optical system. In accordance with this method, not only can the in-focus state and the out-of-focus state be detected but also the direction of the out-of-focus state, namely the near-focus state and the far-focus state. This is very convenient for constituting a servo system for the optical system in order to carry out the automatic focus adjustment. However, in practice, there is no guarantee that in all cases a superior image forming state could always be obtained. To the contrary, there is a possibility that, in all cases, an inferior image forming state might be obtained, whereby it is impossible to detect the in-focus state correctly so that a mistaken result is obtained.

Particularly, in accordance with this method, the focusing state of the optical system is carried out by comparing the outputs of the two photo-electric elements with each other. It goes without saying that the outputs of both elements are equal to each other when the optical system is correctly focused onto the object. When the optical system is in the considerable out-of-focus state, the outputs of both elements are equal or almost equal to each other, so that it is very difficult to discriminate the true in-focus state from the considerable out-of-focus state, which is the principal weak point of the method.

SUMMARY OF THE INVENTION

Under the above-mentioned circumstances, the purpose of the present invention is to improve the focus detecting system in which two signals corresponding to image forming states at two positions, each at the same distance before and behind a predetermined focal plane of the image forming optical system, on which plane the object image is to be correctly focused, are obtained and the focus adjusting state of the image forming optical system for the object is detected by comparing the two signals. This is done in such a manner that the substantial weak point that it is very difficult to discriminate the true in-focus state from the considerable out-of-focus state can be eliminated with a very simple means so as to be able to always carry out a correct focus detection.

Proposed for the above purpose in accordance with the present invention is a novel focus detecting system in which the first and the second signals corresponding to the image forming states at the first and the second positions each almost at the same distance before and behind the predetermined focal plane of the image forming optical system as well as a third signal corresponding to the image forming state at a third position different from the first and the second positions are obtained. The in-focus state of the image formed by the image forming optical system is detected on the basis of a first comparison signal obtained by comparing the first and the second signals with each other, a second comparison signal obtained by comparing the first and the third signals with each other and a third comparison signal obtained by comparing the second and the third signals with each other.

Proposed as the optical composition for obtaining the first, the second and the third signals at the first, the second and the third positions, in accordance with the preferred embodiment to be explained later, is the one in accordance with which the first, the second and the third signals are obtained by stepwise changing, by means of optical path length varying means, the optical path length of the light beam incident upon one of the photo-electric means arranged so as to be able to receive the light beam coming from the optical system. This composition is very advantageous in view of the fact that the possible detection error due to the differences of the characteristics of a plural number of photoelectric means can be maintained at a minimum.

Proposed as the method for obtaining the signals corresponding to the image forming state, in accordance with the preferred embodiment to be explained later, is the one in accordance with which the image formed by the optical system is scanned with image scanning means, while in accordance with the obtained image scanning signals, the variation of the brightness between the picture elements at each two positions close to each other is detected by a brightness variation detecting circuit, whereby the obtained brightness variation detecting signal is transformed non-linearly (provided with different weight in accordance with the level of the signal) by a non-linear transformation circuit, and their absolute value is integrated or added by an integrating or adding circuit so as to obtain the signal output corresponding to the image forming state, particularly the image sharpness. This composition is very advantageous in view of the fact that the sharpness of the image as the image forming state can be detected with very high accuracy.

Further purposes and features of the present invention will become apparent from the following explanation presented in accordance with the accompanying drawings of the embodiments of the present invention.

BRIEF DESCRIPTION OF THE DRAWINGS

Below, the preferred embodiment of the present invention will be explained in accordance with the accompanying drawings, in which:

FIG. 3 shows the outline of the arrangement of the focus detecting system in accordance with the present invention for explaining the principle for focus judgment.

DETAILED DESCRIPTION OF THE PREFERRED EMBODIMENTS

Before explaining the improvement made with the present invention, the conventional focus detecting system, which is the object for the improvement with the present invention, will be explained below in accordance with FIGS. 1 and 2.

Figure 1:
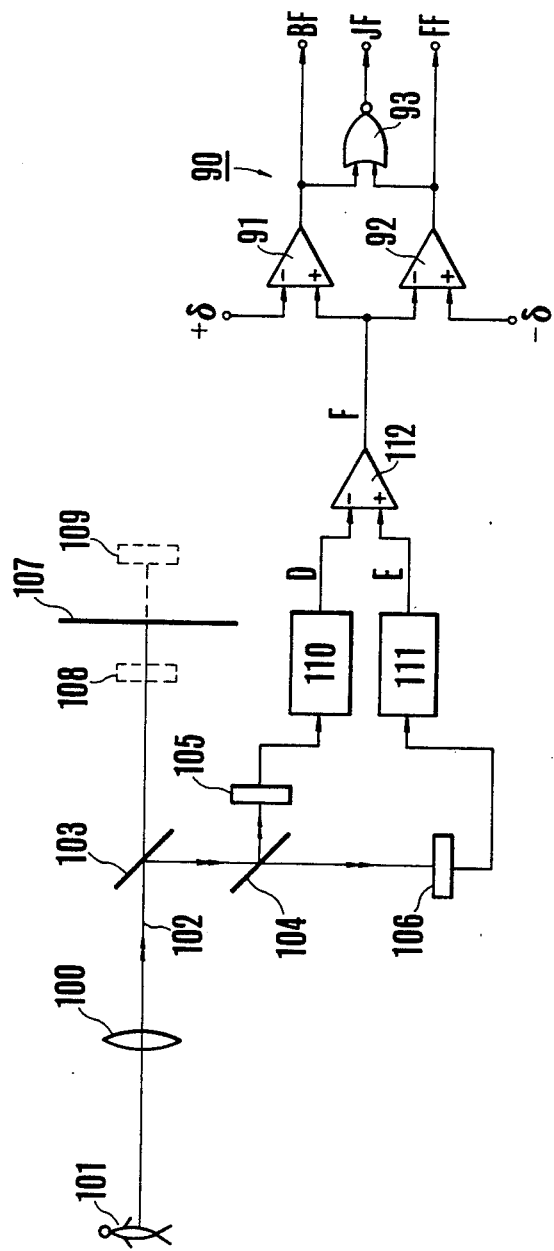
FIG. 1 shows the outline of the arrangement of the conventional focus detecting system for explaining the principle.
Figure 2:
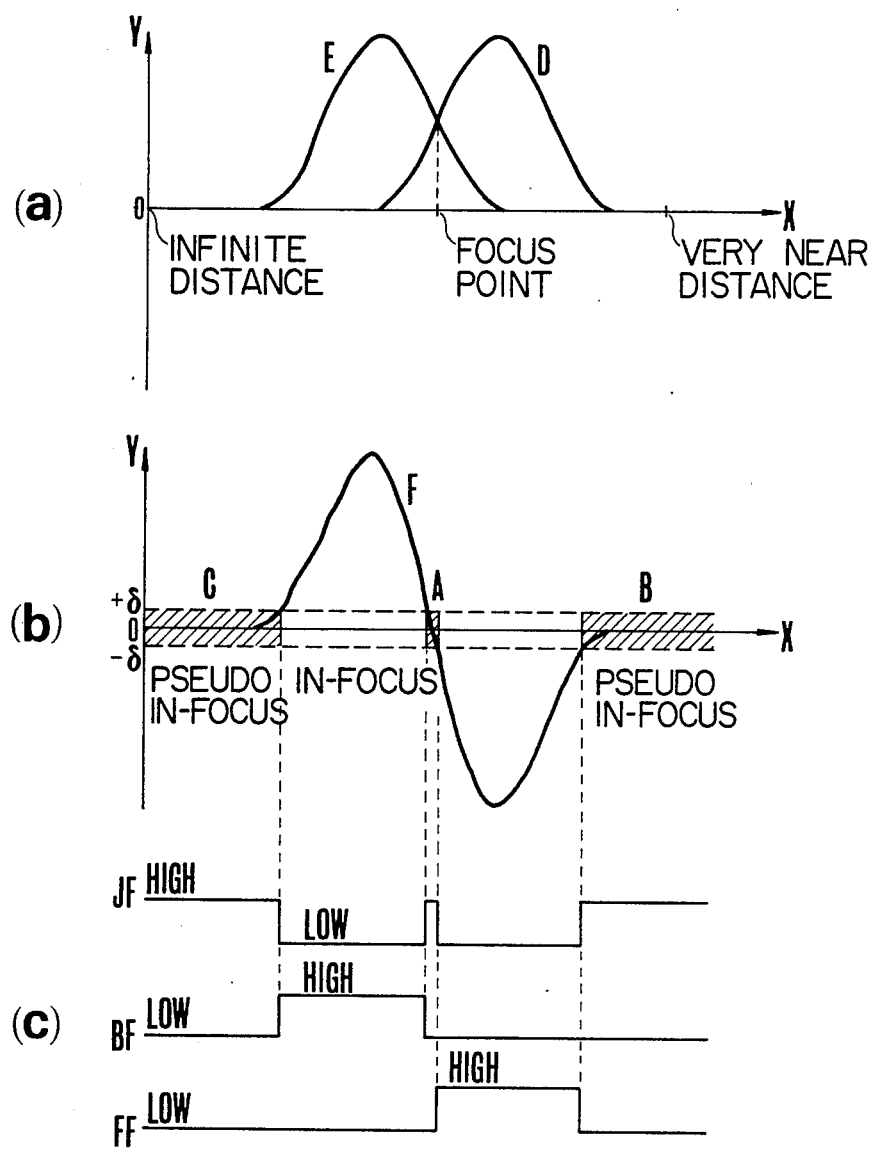
FIG. 2 shows the waveforms of the signals obtained with the composition shown in FIG. 1.

In FIG. 1, a part of a light beam 102 coming from an object 101 through a lens 100 is reflected by a half permeable mirror 103 obliquely arranged on an optical axis of the lens 100, then further divided into two by means of a half permeable mirror 104 and incident on photo-electric light receiving means 105 and 106 having the same characteristics, the outputs of which vary in correspondence to the variation of the image sharpness. On the other hand, the light beam passing through the mirror 103 is incident upon a predetermined focal plane. The photo-electric light receiving means 105 and 106 are arranged at the positions equivalent to the two positions 108 and 109, respectively, before and behind the predetermined focal plane 107 but positioned by the same distance with respect to the focal plane. 110 and 111 are, respectively, output processing circuits for the light receiving means 105 and 106, whereby the sharper the image on the light receiving means 105 and 106 is, the larger is the level of the output signals of the circuits 110 and 111. FIG. 2(a) shows the outputs D and E of the processing circuits 110 and 111 (for example, the voltage) along the Y axis as the functions of the adjusting amount of the lens 100 along the X axis, when the object is positioned between the very near distance and the infinite distance. Hereby, X=0 corresponds to the infinite distance. As is shown in the drawing, the variations of the outputs D and E along with the adjustment of the lens 100 represent curves which have a peak at symmetrical positions with reference to the focus point. Hereby, the differential amplifier 112 produces the difference F=E−D. The variation of the difference output F represents a sinusoidal curve as is shown in FIG. 2(b). Ideally, the in-focus state is considered to be obtained when F=0. However, this is very difficult so that generally $|F|<\delta$ ($\delta$: an optical standard voltage level) is set as the focusing conditions. However, in this case, as is shown in FIG. 2(b), there takes place ranges $|F|<\delta$ on both sides of the true in-focus range A in the adjusting range of the lens 100, namely, ranges B and C which are considered the in-focus ranges in view of the signal level (pseudo in-focus state) in such a manner that it is difficult to discriminate the true in-focus state from the considerable out-of-focus state (pseudo in-focus state) so as to cause danger of false detection.

That is, as is shown in FIG. 1, in case a determined circuit 90, consisting of a first comparator 91 to whose non-inverting input terminal the output F of the differential amplifier 112 is supplied and to whose inverting input terminal the standard voltage $+\delta$ is supplied, a second comparator 92 to whose inverting input terminal the output of the differential amplifier 112 is supplied and to whose non-inverting input terminal the standard voltage $-\delta$ is supplied and a NOR gate 93 for carrying out the NOR operation of the outputs BF and FF of the comparators 91 and 92 is provided, the level of the output BF of the first comparator is low, when $F<+\delta$, and high when $F \geq +\delta$, the level of the output FF of the second comparator 92 is low, when $F>-\delta$, and high when $F \leq -\delta$, and the level of the output JF of the NOR gate 93 is high when $-\delta<F<+\delta$, namely, $|F|>+\delta$, so that it is expected that the high level of the output BF of the first comparator 91 represents the far-focus state (the state in which the object image formed by the lens 100 is positioned behind the predetermined focal plane 107), the high level of the output FF of the second comparator 92 represents the near-focus state (the state in which the object image formed by the lens 100 is positioned before the predetermined focal plane 107) and the high level of the output JF of the NOR gate 93 represents the in-focus state. However, as is shown in FIG. 2(c), the level of the output JF of the NOR gate 93 is also high for the portions corresponding to the areas B and C in FIG. 2(b) so that it is impossible to discriminate the true in-focus state from the pseudo in-focus state.

The present invention is intended to eliminate the above inconvenience of the conventional focus detection system as follows. Below, the principle of the present invention will be explained. Besides the two photo-electric light receiving means explained in accordance with FIG. 1, a third photo-electric light receiving means whose characteristics are the same as that of the above two light receiving means is provided at a position comparatively distant from the predetermined focal plane of the lens in such a manner that the output of the third photo-electric light receiving means is subtracted from the outputs of the above two photo-electric light receiving means, whereby both of the two difference signals are larger than a certain value ($\delta$) in the true in-focus state, while the sign of the difference signals in the pseudo in-focus state are different from those in the true in-focus state or smaller than the value ($\delta$). By making use of this fact, the true in-focus state can be correctly detected by discriminating the true in-focus state from the pseudo in-focus state.

That is, in the case of the arrangement shown in FIG. 3, the ⅓ of the light beam which has been taken out by means of the half permeable mirror 103 obliquely arranged on the optical axis of the lens 100 is reflected by a half permeable mirror 113 whose ratio of the reflection index to the permeability index is 1 to 2 and directed toward the photo-electric light receiving means 105, whereby one half of the light beam which has passed through the mirror 113 is reflected by a half permeable mirror 114 whose ratio of the reflection index to the permeability index is 1:1 and directed toward the photo-electric light receiving means 106, while another half of the light beam is directed toward a third photo-electric light receiving means 115 having the same characteristics. Hereby, the light receiving means 105 and 106 are arranged at the positions equivalent to the two positions located at the same distance before and behind the predetermined focal plane 107 of the lens 100, while on the other hand, the newly arranged third light receiving means 115 is arranged a little behind the position 109 which is equivalent to the position of the light receiving means 106 on the optical axis of the lens 100, namely, at the position equivalent to the position 117 comparatively distant from the predetermined focal plane 107. Further, 116 is a processing circuit for the third light receiving means 115, having the same characteristics of the circuits 110 and 111.

Figure 4:
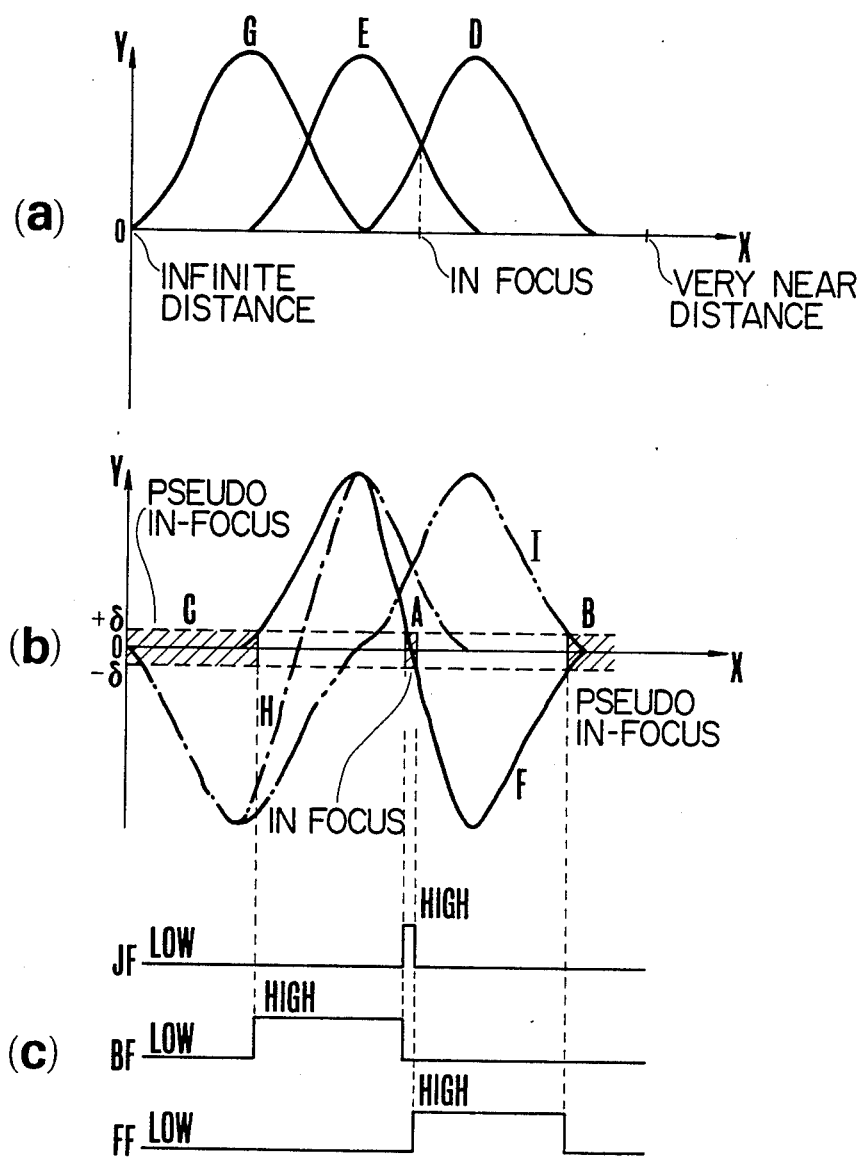
FIGS. 4, 5 and 6 show the waveforms obtained with the composition shown in FIG. 3, respectively, corresponding to the case where the object is at the middle position, at the infinite position and the very near position.

Now, under the same conditions as mentioned above, namely, under the condition where the object 101 is positioned between a very near distance and the infinite distance, the outputs D, E and G of the processing circuits 110, 111 and 116 are indicated with reference to the adjustment of the lens 100 with the same dimensions. Then, as is shown in FIG. 4(a), the variation of the output G of the processing circuit 116, along with the adjustment of the lens 100, represents a curve having a peak closer to the side of the infinite distant than that of the output E of the processing circuit 111. Hereby, the differential amplifier 112 produces the output F (=E−D), a differential amplifier 118 produces an output H (=E−G) and a differential amplifier 119 produces an output I (=D−G), as is shown in FIG. 4(b). Now, assume that the in-focus condition is $|F|<\delta$ in the same way as mentioned above. As is understood from FIG. 4(b), both H and I in the pesudo in-focus range B closer to the side of the very near distance in the adjusting range of the lens 100 are smaller than a certain predetermined value ($\delta$), and both H and I in the pseudo in-focus range C closer to the side of the infinite distance are negative, while both H and I are larger than the certain value ($\delta$) in the true in-focus state.

Figure 5:
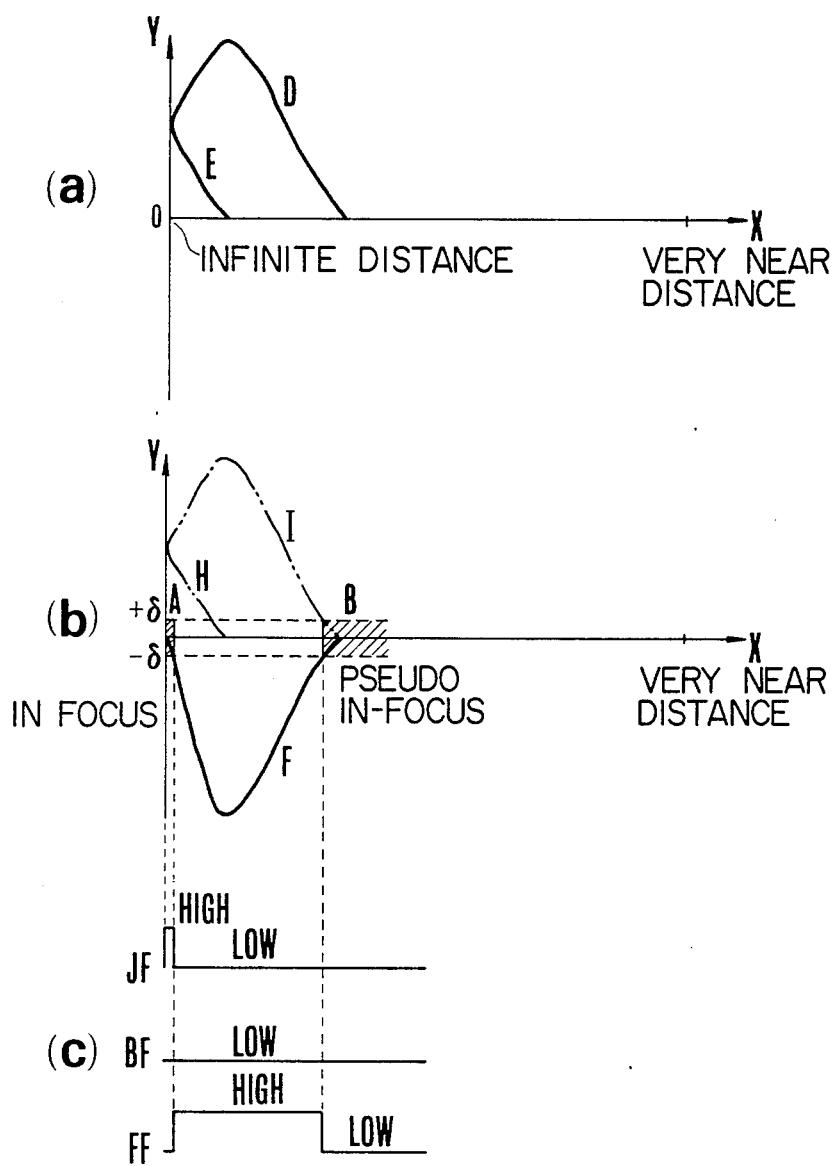
Figure 6:
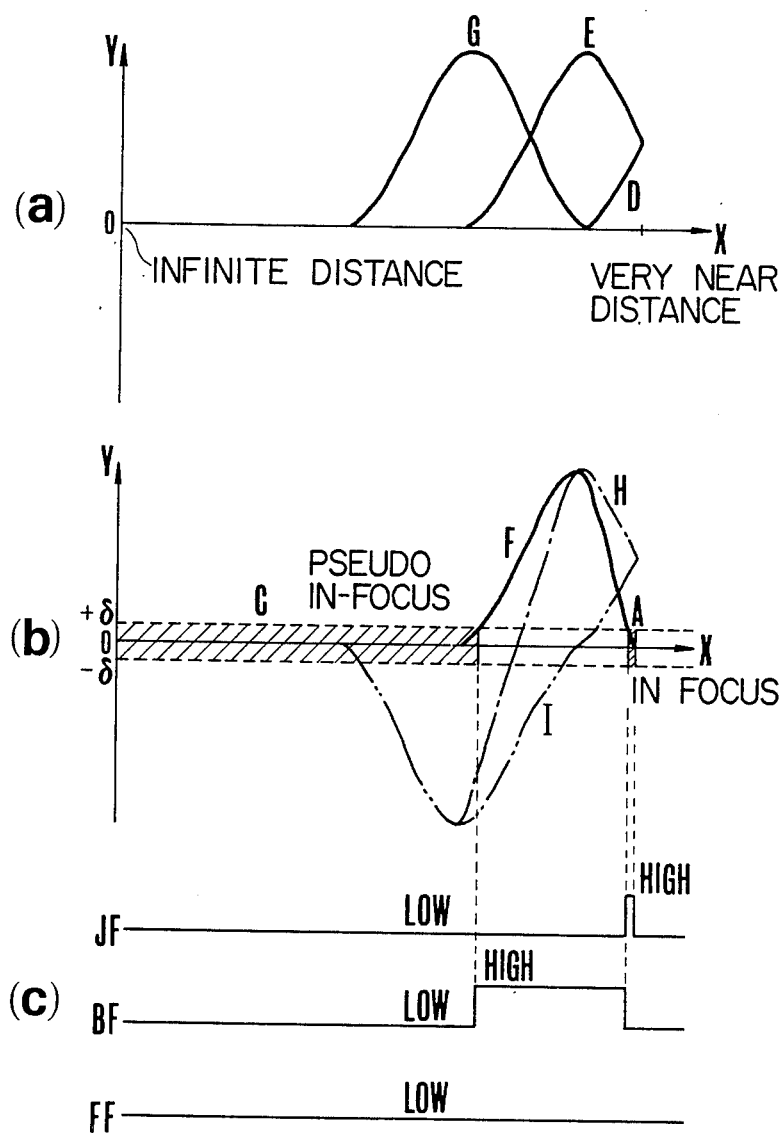

The above is the case where the object 101 is between the very near distance and the infinite distance. On the other hand, when the object is at the infinite distance, the outputs D and E are as shown in FIG. 5(a) (the output G is zero), and in this case, the difference outputs F, H and I are as is shown in FIG. 5(b), whereby both H and I are smaller than the certain value ($\delta$) in the pseudo in-focus range B closer to the side of the very near distance. Further, when the object 101 is at the nearest distance, the outputs D, E and G are as shown in FIG. 6(a), and in this case, the difference outputs F, H and I are as shown in FIG. 6(b), whereby both H and F are negative in the pseudo in-focus range C closer to the side of the infinite distance.

Thus, by adding the in-focus condition $H > +\delta$ and $I > +\delta$ to $|F| < \delta$, it becomes possible to discriminate the true in-focus state from the pseudo in-focus state clearly so that it is always possible to detect the true in-focus state correctly. That is, as is shown in FIG. 3, besides the construction shown in FIG. 1, third and fourth comparators 94 and 95 to whose non-inverting inputs and outputs H and I of the above differential amplifiers 118 and 119 are supplied, respectively, and to whose inverting inputs the standard voltage $+\delta$ are supplied and an AND gate 96 for carrying out the "AND" operation of the outputs of the comparators 94 and 95 and the output of the NOR gate 93 are provided as determinant circuit 90, the level of the output JF of the AND gate 96 is high only when $-\delta < F < \delta$ (namely $|F| < +\delta$) and also $H > +\delta$ and $I > +\delta$, so that the level of the output JF of the AND gate 96 is necessarily low in the pseudo in-focus range B and C as shown in FIG. 4(c), FIG. 5(c) and FIG. 6(c) in such a manner that the true in-focus state and the pseudo in-focus state can be discriminated from each other correctly.

Below, a preferred embodiment of the present invention will be explained.

Figure 7:
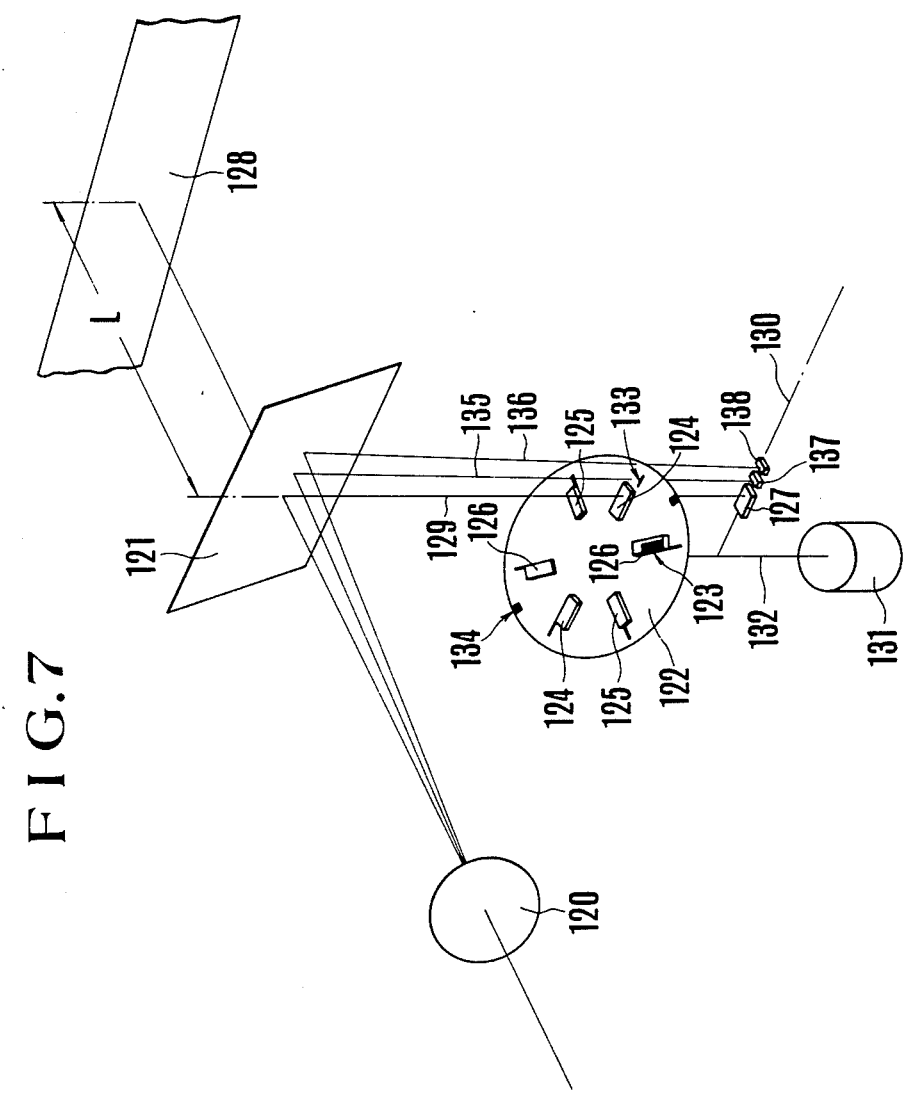
FIG. 7 shows the outline of the optical arrangement of an embodiment in accordance with the present invention in perspective view.

FIG. 7 shows the optical arrangement of an embodiment of the present invention. The present embodiment is so designed that it is possible to obtain the signals of the image forming state of the image at the three positions 108, 109 and 117 in FIG. 3 only by means of one photo-electric light receiving means by making use of an optical path length variation means, whereby a linear image sensor is used as a photo-electric light receiving means. That is, in the drawing, the light beam, having passed through a lens 120, is deflected downwards by a totally deflecting mirror 121 provided obliquely on an optical axis and incident almost on the circumstance of a rotary disc 122. The mirror 121 can be withdrawn out of the optical path for exposing a film 128. The plane of the rotary disc 122 is provided with 3n pieces of radially extending rectangular slits 123 at an equal distance between each other (n: an optical integer number larger than 1—in the present embodiment n=2), while beneath the rotary disc 122, a linear image sensor 127 (hereinafter called line sensor) as photo-electric light receiving means is arranged so as to receive a light beam having passed through a corresponding slit every rotation of the rotary disc 122 at (120/n) degree. On the other hand, on every third slit 123 of the rotary disc, three kinds of optical path length variation members 124, 125 and 126 having different thickness $t_1$, $t_2$ and $t_3$ ($t_1 > t_2 > t_3$) but the same refractive power n are secured in sequence as shown in the drawing. Now, let the distance between the mirror 121 and the film 128 be L and the amount of the optical path length increased by means of the optical path length variation means 124, 125 and 126 be $l_1$, $l_2$ and $l_3$ $$\text{(hereby } l = t\left(1 - \frac{1}{n}\right)\text{)}$$

so that it is clear that $l_1 > l_2 > l_3$). Further, let the line sensor 127 be provided at a distance represented by $L + l_2 + (l_1 - l_2)/2$ $$\left(= L + \frac{l_1 + l_2}{2}\right)$$

from the mirror 121. When the optical path length variation member 124 is brought in front of the light sensor 127 during the rotation of the disc 122, the line sensor 127 is equivalently supposed to receive the image at a position before the film plane by $(l_1-l_2)/2$. When the optical path length variation member 125 is brought in front of the line sensor 127, the line sensor 127 is equivalently supported to receive the image at a position behind the film plane by $(l_1-l_2)/2$. When the optical path length variation member 126 is brought in front of the line sensor 127, the line sensor 127 is equivalently supposed to receive the image at a position behind the film plane by $(l_1+l_2)/2-l_3$. In this way, along with the rotation of the disc 122, the signals corresponding to the image forming state at the two positions 108 and 109 before and behind the predetermined focal plane 107 by an equal distance and the third position 117 can be obtained in a time sharing way from the line sensor 127 as explained in accordance with FIG. 3. Further, in this case, the dimension of the slits 123 on the disc 122 and the optical path length variation members 124, 125 and 126 secured on the slits 123 should be so large as to be necessary and sufficient for covering the effective light receiving view field of the line sensor 127. Further, in this case, the disc 122 is coaxially secured on an axis of a pulse motor 131 in such a manner that every time one driving pulse is given to the motor 131, the disc 122 rotates in a plane perpendicular to the optical path 129 by 120/n degree.

Figure 8:
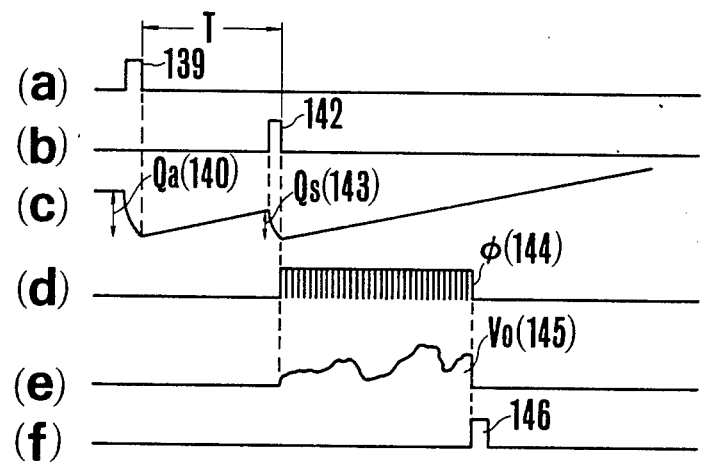
FIG. 8 shows the driving pulses for the line sensor shown in FIG. 7 and the output signals thereof.

Outside of the slits 123 along the front edges of the slits 123, holes 133 are provided so as to correspond to the slits 123. Further outside, a notch 134 is provided at positions just in the middle between the optical path length variation members 126 and 124. Switching type light response elements 137 and 138, such as photo-transistors, are provided together with the line sensor 127 along the straight line 130 so as to receive the light beam having passed through the holes 133 and 134 in such a manner that the output signals of the elements 137 and 138 are used as timing signals. The line sensor 127 consists of a photo-electrical conversion storage part composed of a plurality of photo-sensors such as photo diodes arranged linearly as is well-known, a transfer part for successively transferring the charge stored in each photo-sensor and a shift gear for taking the stored charge in each photo-sensor into the transfer part, whereby the charge proportional to the amount of the light incident on each photo-sensor is successively read out time serially within a certain determined time, being driven by means of control pulses shown in FIG. 8. That is, in this case, the photo-electric conversion storage part has a saturation prevention discharge gate (i.e. anti-blooming gate) in such a manner that a clear pulse 139 is given to the discharge gate, the pulse 139 is given to the discharge gate, the unnecessary charge Qa (140) stored in each photo-sensor is eliminated or discarded, whereby the signal charge is started to be stored from the beginning. Then, when a shift pulse 142 is given to the shift gate, the storage is suspended, whereby the signal charge Qs (143) stored in every photo-sensor during the time T (the so-called charge store time) from the falling down of the pulse 139 until the falling down of the pulse 142 is delivered to the transfer part. The transfer part consists of an analog shift register in such a manner that by means of clock pulse $\phi$ (144) (Hereby, for convenience sake, only one kind of clock pulse is shown. However, in accordance with the type of the analog shift register, the two, three or four phase clock pulses are delivered in practice.), the charge is successively delivered to an output part, from which the charge converted into a voltage Vo (145) is taken out. When the transfer is terminated, transfer termination pulse 146 is produced. Along with the rotation of the disc 122, the information of the image forming states at the positions 108, 109 and 117, shown in FIG. 3, are sampled from the line sensor 127 by the operation of the optical path length variation members 124, 125 and 126 in such a manner that after the termination of the sampling at the position 117, the sampled values are compared in order to detect the focusing condition. In the case of the present embodiment n=2 so that focusing condition determining data is obtained twice per one rotation of the disc 122.

Below, a concrete embodiment of the in-focus state determining circuit applicable to the construction shown in FIG. 7 will be explained in accordance with FIG. 9. Hereby, (a), (b), (d), (e) and (f) in the drawing correspond to the pulses or the signals in FIG. 8.

When a pulse 156 is produced at the time of connection of the power source or completion of the data sampling, the pulse generator 147 produces a single pulse 148, which is delivered through a motor driving circuit 149 to a pulse motor 131 so as to rotate the disc 122 by 120/n degree in order to move the slit 123 to a certain determined position, whereby the light beam 135 is incident upon the light response element 137 through the hole 133 and the level of the output of the element 137 becomes high. In synchronization with the transient of the output of the light response element 137 from the low level to the high level, a trigger pulse generator 150 produces a trigger pulse 151 to be delivered to a sensor driving circuit 152. In accordance with the trigger pulse 151, the sensor driving circuit 152 delivers the clear pulse 139 (FIG. 8(a)), the shift pulse 142 (FIG. 8(b)) after a certain determined integrating time from the pulse 139 and the clock pulses 144 (FIG. 8(d)) to the line sensor 127. Then, the peak value of the obtained output 145 (FIG. 8(e)) of the sensor 127 is detected by a peak value detecting circuit 153 in such a manner that whether the peak value of the output 145 is in a proper range or not by an integrating time changing circuit 154, whereby if the peak value is outside of the proper range, an integrating time changing signal 155 is delivered to the sensor driving circuit 152, which again delivers the pulses 139, 142 and 144 to the sensor 127, varying the integrating time T shown in FIG. 8, which operation is repeated until the peak value of the sensor output 145 comes within the proper range. When it is confirmed that the peak value of the sensor output 145 is proper, the sensor driving circuit 152 produces the pulse 156 in synchronization with the transfer termination pulse 146. The pulse 156 is delivered to the pulse generator 147 so as to be used for starting the next data sampling operation and also to the clock input terminal of an optical path length discriminating counter 157 so as to advance th counting of the counter 157 by one. The counter 157 is a 3 count ripple counter, the level of the output of a prdetermined output terminal thereof is kept high between the input of one clock pulse and the next one. Hereby, the output terminal of the count "1" of the counter 157 is connected to one input terminal of a two input AND gate 158, the output terminal of the count "2" is connected to one input terminal of an AND gate 159 and the output terminal of the count "3" is connected to one input terminal of an AND gate 160. On the other hand, the pulse 156 is delivered to the other input terminals of the AND gates 158, 159 and 160 so that corresponding to the data sampling at the three different positions 108, 109 and 117, the AND gates 158, 159 and 160, respectively, produce a pulse in synchronization with the pulse. That is, for the data sampling (at the position 108) for the optical path length variation 124, the AND gate 158 produces a pulse 161 in synchronization with the pulse 156, for the data sampling (at the position 109) for the optical path length variation member 125, the AND gate 159 produces a pulse 162 and for the data sampling (at the position 117) for the optical path length variation member 126, the AND gate 160 produces a pulse 163. The disc 122 rotates along the direction along which the optical path length members 124, 125 and 126 move as 124→125→126→124, whereby with the hole 134 provided at the middle between the optical path length variation members 126 and 124 and the light response element 138, a pulse is obtained from the light response element 138 during the shifting from the optical path length variation members 126 to 124, namely, shifting from positions 117 to 108, whereby the obtained pulse is delivered through a waveform reforming circuit 164 to the reset terminal of the optical path length discriminating counter 157 so as to bring the count of the counter 157 down to zero. The output 145 of the line sensor 127 is delayed by a delay circuit 165 by a certain determined time, whereby the difference between the delayed signal and the non-delayed signal is obtained by a differential amplifier 166 and the obtained difference signal is differentiated by a differentiating circuit (that is, the delay circuit 165, the differential amplifier 166 and the differentiating circuit 167 constitutes a brightness variation detecting means for detecting the derivative of the brightness between each two picture elements at the two positions close to each other so that the output of the differentiating circuit 167 is the brightness variation signal). Said brightness variation signal is then squared by a square circuit 168 as a non-linear and absolute value conversion means and then integrated by an integrating circuit 169. The integrated circuit 169 is reset when an analog switch 170 is closed by the shift pulse 142. The integrated value of the one sample is transferred to storage condensers 174, 175 and 176 as memory means so as to be stored there through analog switches 171, 172 and 173 to be closed by the optical path length discrimination pulses 161, 162 and 163 in synchronization with the pulse 156. Thus, the data sample values D, E and G (FIGS. 4-6) at the positions 108, 109 and 117 are stored in the condensers 174, 175 and 176. The stored values D, E and G are delivered to differential circuits 180, 181 and 182 through buffer amplifiers 177, 178 and 179 in such a manner that the differential circuit 180 produces D−E, the differential circuit 181 produces E−D and the differential circuit 182 produces E−G, whereby D−E and E−D are, respectively, compared with a predetermined standard voltage level $\delta_1$ by means of comparison circuits 183 and 184 while E−G is compared with a predetermined voltage $\delta_2$ by means of a comparison circuit 185. $\delta_1$ and $\delta_2$ are the values for determining the range of the signal level considered to be the in-focus state and to be experimentally decided, and can be the same value. The level of the output 186 of the comparison circuit 183 is high when $(D-E)<\delta_1$, while the level of the output 187 of the comparison circuit 184 is high when $(E-D)<\delta_1$, whereby when the logical product of the above two is obtained by means of an AND gate 189, the level of the output 190 thereof is high when $(D-E)<\delta_1$. On the other hand, the level of the output of the comparison circuit 185 is high when $(E-G)<\delta_2$, whereby when the product of the output with that 190 of the AND gate 189 is obtained by means of an AND gate 191, the level of the output 192 thereof is high when $|D-E|<\delta_1$ and $(E-G)>\delta_2$ so that it is possible to determine whether it is in the in-focus state or not. The outputs 186 and 187 of the comparison circuits 183 and 184 are, respectively inverted by means of inverters 204 and 205, whereby when the output 206 of the inverter 204 is high, $D>E+\delta_1$, namely, the image is focused at the position before the film 128, while the output 207 of the inverter 205 is high, $E>D+\delta_1$, namely, the image is focused at the position behind the film 128. The outputs 206 and 207 of the inverters 204 and 205 and the output 192 of the AND gate 191 are delivered to D input terminals of D type flip-flops 193, 194 and 195, which state is transferred to Q output terminals of the flip-flops 193, 194 and 195 in synchronization with a pulse 197 delayed by means of a delay circuit 196 by a certain time after a pulse signal 163 indicative of completion of the data sampling at the position 117 so as to be held until the arrival of the next data sampling. The Q outputs of the flip-flops 193, 194 and 195 are delivered to display circuits 201, 202 and 203 each consisting of a resistance, a transistor and an LED as display element so as to display the near-focus state, the far-focus state and the in-focus state. (In the drawing, only the construction of the display circuit 203 is shown, whereby it goes without saying that the display circuits 201 and 202 may present the same construction.) The time delayed by means of the delay circuit 196 is chosen so as to be larger than the sum of the time necessary for the sample value at the position 117 to be stored in the condenser 176 and that necessary for the calculation. That is, the information of the image forming states at the positions 108, 109 and 117 are successively sampled until the sampling at the position 117 has been terminated, when the focusing state is judged so as to display the result, whereby the flip-flops 193, 194 and 195 and the delay circuit 196 can be eliminated in such a manner that the outputs 206 and 207 of the inverters 204 and 205 and the output 192 of the AND gate 191 are directly delivered to the display circuits 201, 202 and 203 so as to judge the focusing state at every data sampling and display the result.

Figure 9:
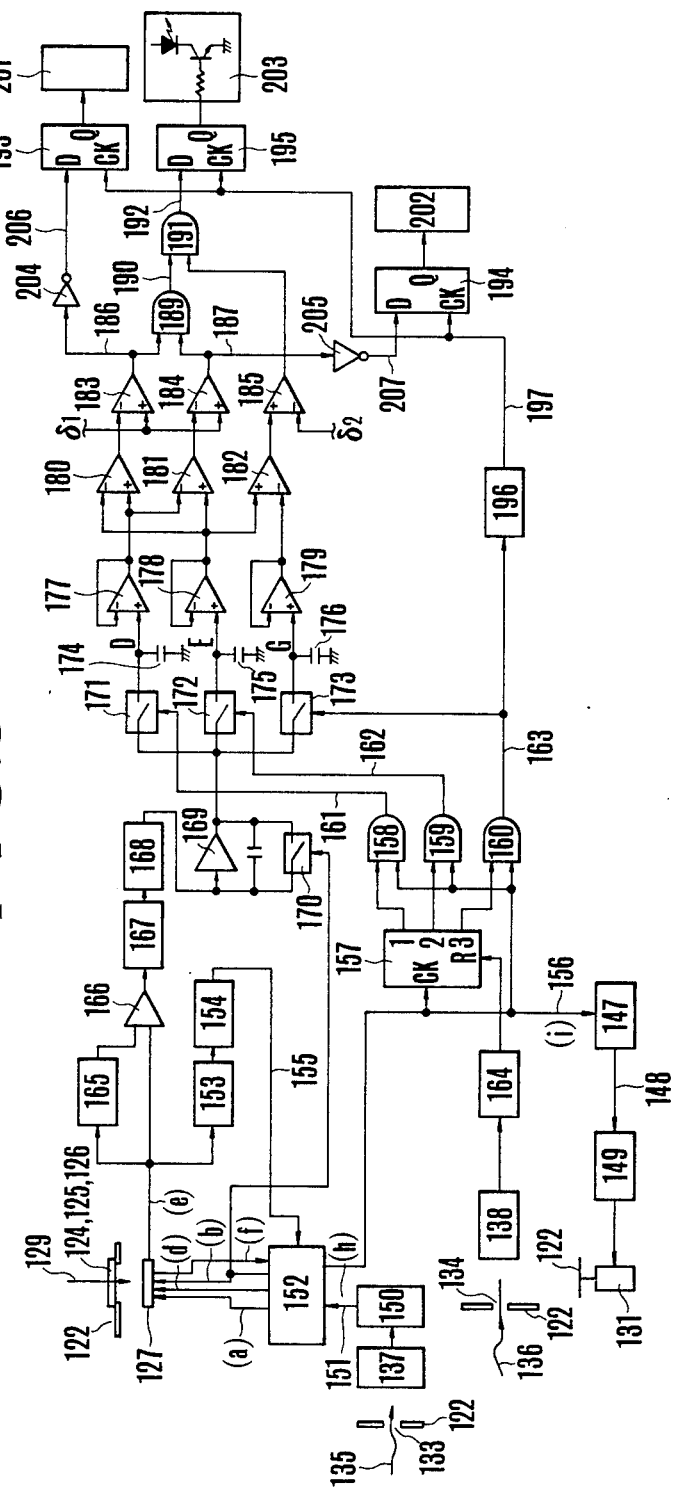
FIG. 9 shows the block diagram of an embodiment of the electrical circuit system applied to the composition shown in FIG. 7.
Figure 10:
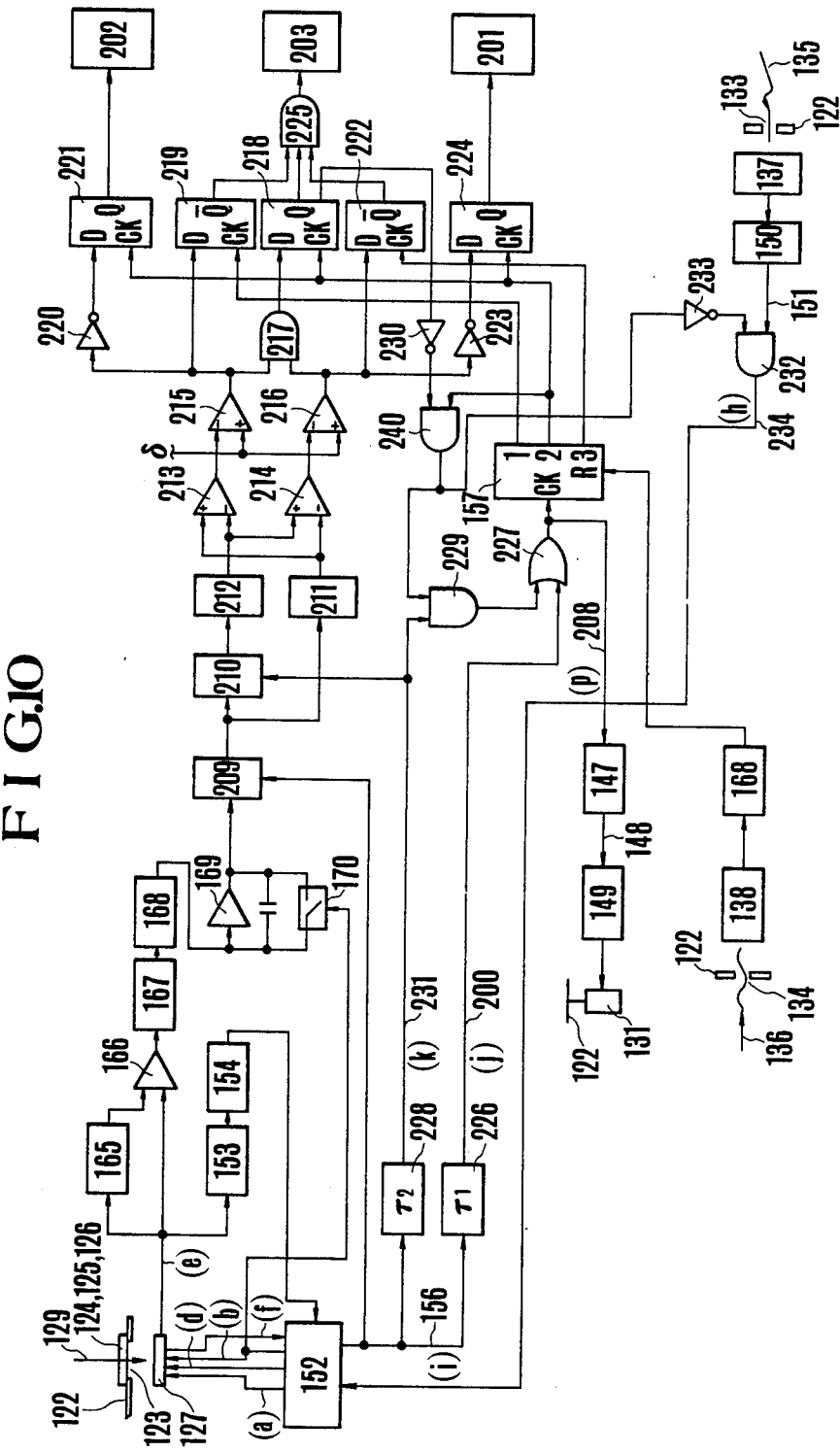
FIG. 10 shows the block diagram of another embodiment of the electrical circuit system applied to the composition shown in FIG. 7.

FIG. 10 shows a variation of the embodiment shown in FIG. 9. Hereby, along with the rotation of the disc 122, the data at the positions 108, 109 and 117 are successively sampled, whereby the newly obtained sample value is compared with the preceding sample value in such a manner that when the condition $|D-E|<\delta$ is not satisfied the data sampling at the position 117 is eliminated and the sampling in the sequence 108→109 is again started. When the condition $|D-E|<\delta$ is satisfied, the normal sampling in the sequence 108→109→117→108 . . . is carried out. This operation is effective when the field to be photographed is so dark that it needs substantial time to carry out one sampling.

Figure 11:
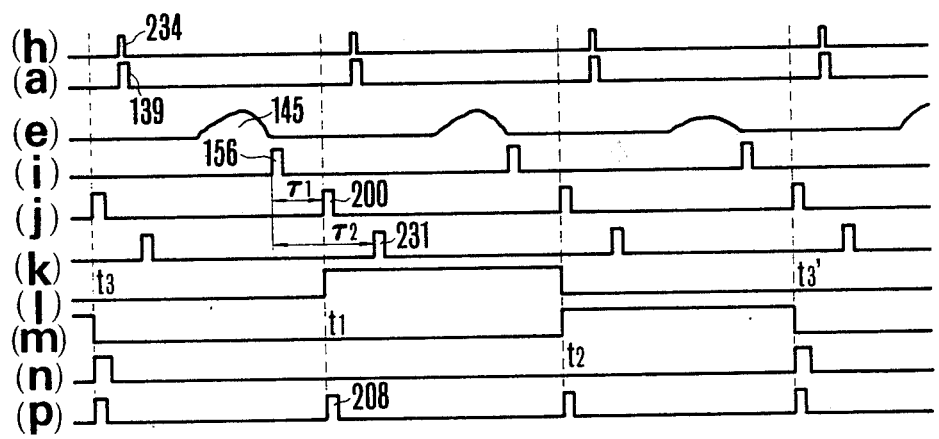
FIGS. 11 and 12 show the output signals of the important circuit blocks of the circuit system shown in FIG. 10.
Figure 12:
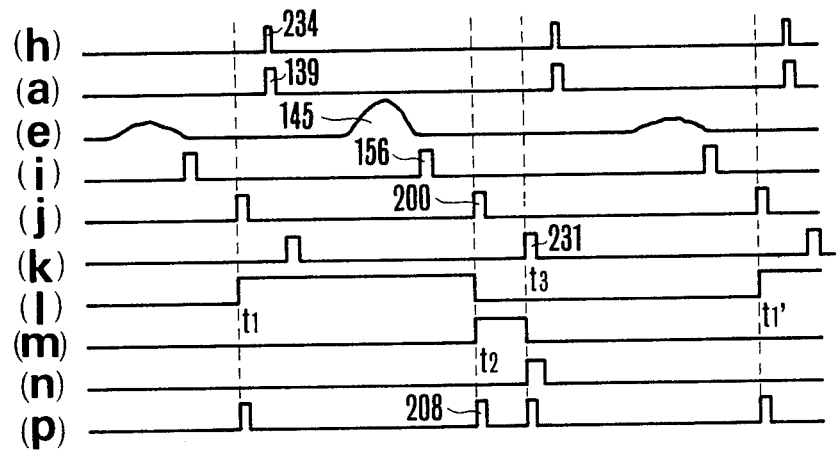

FIGS. 11 and 12 show the signals produced at the important circuit blocks in the circuit.

Below, the present embodiment will be explained in accordance with the waveforms shown in FIGS. 11 and 12.

By closing of the power source switch or the pulse 208 shown in FIGS. 11(p) and 12(p), the pulse generator 147 produces a single pulse 148, when the pulse motor 131 is operated by means of the motor driving circuit 149 so as to rotate the disc by 120/n degree. Along with the rotation of the disc 122, the trigger pulse 151 is produced by the trigger pulse generating circuit 150 in accordance with the output of the light response element 137 and delivered to the sensor driving circuit 152 through the AND gate 232 to be explained later, so as to operate the line sensor 127. The operation until the output 145 (FIG. 11(e) and FIG. 12(e)) of the line sensor 127 has been processed so that the sample values appear at the output terminal of the integrating circuit is the same as that of the embodiment shown in FIG. 9. The sample value is delivered to an A/D (Analog to Digital) conversion circuit 209 of parallel output type so as to be converted into a digital value while the level of the sampling termination pulse 156 (FIG. 11(i) and FIG. 12(i)) is high. The digital value is delivered to a shift register 210 of parallel input-parallel output type and at the same time to a D/A (Digital to Analog) conversion circuit 211 of parallel input type so as to be re-converted into an analog amount. In the shift register 210, the preceding sample value is stored as a digital amount, which is converted into an analog amount by a D/A (Digital to Analog) conversion circuit 212 of the parallel input type. The different between the outputs of the D/A (Digital to Analog) conversion circuits 217 and 212 are obtained by differential circuits 213 and 214 in such a manner that the differential circuit 213 produces E−D, G−E and D−G in succession for each sampling, while the differential circuit 214 produces D−E, E−G and G−D in succession for each sampling. The outputs of these differential circuits 213 and 214 are delivered to the negative input terminals of comparators 215 and 216 so as to be compared with the standard voltage level δ, whereby the logic products of the outputs thereof are obtained by an AND gate 217 and delivered to the D input terminal of a D type flip-flop 218 at whose Q output terminal the above logic products appear in synchronization with the transient of the count "2" output of the optical path length discriminating counter 157 from the low level to the high level. When at the time point $t_2$, $|D−E|<δ$, the level of the Q output of the flip-flop 218 is high, which state is maintained until the next transient time point ($t_2'$) of the count "2" output of the counter 157 from the low level to the high level. Further, on the other hand, the output of the comparator 215 is delivered to the D input terminal of a D type flip-flop 219 and to the D input terminal of a D type flip-flop 221 through an inverter 220. Further, the output of the comparator 216 is delivered to the D input terminal of a D type flip-flop 222 and to the D input terminal of a D type flip-flop 224 through an inverter 223. The flip-flops 219 and 222, respectively, produce at their $\bar{Q}$ outputs the respective state of invert input in synchronization with the transient ($t_1$) of the count "1" output of the counter 157 from the low level to the high level and the transient ($t_2$) of the circuit "3" output from the low level to the high level. The logic products of the $\bar{Q}$ outputs of the flip-flops 219 and 222 with the Q output of the flip-flop 218 are obtained by an AND gate 225 so as to be displayed with the display circuit 203. That is, when $|D−E|<δ$, $(D−G)>δ$ and $(E−G)>δ$, the LED of the display circuit 203 lights to show the in-focus state. Further, at the time point $t_2$ the inputs of the flip-flops 221 and 224 are, respectively, transferred to their Q output terminals, which states are, respectively, displayed by the display circuits 202 and 201. When $D>E+δ$, namely, in the case of the near-focus state, the level of the Q output of the flip-flop 224 is high, whereby the LED of the display circuit 201 lights, while when $E>D+δ$, namely, in the case of the far-focus state, the level of the Q output of the flip-flop 221 is high, whereby the LED of the display circuit 202 lights. The sample termination pulse 156 is, on the other hand, delayed by the delay circuit 226 by a small amount of time $t_1$ to be a pulse 200 (FIG. 11(j) and FIG. 12(j)) and further to be the pulse 208 through an OR gate 227, which pulse is delivered to the pulse generator 147 as mentioned above, so as to drive the motor 131 and also to the counter 157 so as to advance the count by one. On the other hand, the logic product of the inverted signal of the Q output of the flip-flop 218 given through the inverter 230 with the count "2" output of the counter 157 is obtained by an AND gate 240, and then the product of the pulse 231 which is given by delaying the pulse 156 by the delay circuit by a small amount of time $τ_2 (τ_2>τ_1)$ with the output of the AND gate 240 is obtained by means of an AND gate 229, whereby when the level of the Q output of the flip-flop 218 is low at the time point $t_2$, the output of the AND gate 229 is converted into the pulse 208 through the OR gate 227 and delivered to the pulse generator 147, as mentioned above, so as to drive the motor 131 and advance the count of the counter 157 by one. Hereby, the delay time $τ_1$ of the delay circuit 226 is chosen sufficiently large for covering the time from the start of the digital conversion of the analog input in the A/D (Analog to Digital) conversion circuit 209 until the appearance of the new results at the D input terminals of the flip-flops 218, 219, 221, 222 and 224, while the delay time $τ_2$ of the delay circuit 228 is chosen, besides $τ_1$, sufficiently large for covering the time from the start of the rotation of the disc 122 by means of the output of the delay circuit 226 until a certain determined rotation amount has been obtained. That is, when at the time point $t_2$ the level of the Q output of the flip-flop 218 is low, in other words, $|D−E|>δ$, the pulse 231 is delayed by $τ_2$ into the pulse 208, which further drives the disc 122 by (120/n) degree in such a manner that the data sampling at the position 117 is eliminated so as to start the sampling at the position 108.

In the case of the embodiment shown in FIG. 9, at every rotation of the disc 122 by a certain determined angle, the trigger pulse producing circuit 150 produces the trigger pulse so as to drive the sensor drive circuit 152, while in the case of the present embodiment it is necessary to put out the pulse 151 when the data sampling at the position 117 is eliminated, which is carried out by means of an AND gate 232 in the present embodiment. That is, the AND gate 232 is intended to obtain the logic product of the output 151 of the trigger pulse producing circuit 150 with the output of an inverter 233 for inverting the output of the above AND gate 240, whereby because only when $|D−E|>δ$ and the counter 157 is "2" count is the level of the output of the AND gate 240 high, the trigger pulse 151 is not produced from the AND gate 232 when $|D−E|>δ$ and the counter 157 is "2" count, in such a manner that when $|D−E|>δ$, the data sampling at the position 117 is eliminated. The output of the AND gate 232 is shown in FIG. 11(h) and FIG. 12(h).

FIG. 11 shows the waveforms when $|D−E|<δ$, while FIG. 12 shows the waveforms when $|D−E|>δ$. When $|D−E|>δ$ as is shown in FIG. 12, no trigger pulse 234 is produced from the AND gate 232 between the time point $t_2$ and $t_3$, while the pulse 231 after the time point $t_2$ is produced as the pulse 208 so that the data sampling at the position 117 is eliminated so as to start the data sampling at the position 108.

Hereby, (l), (m) and (n) in FIGS. 11 and 12 show, respectively, the count "1" output, the count "2" output and the count "3" output of the counter 157.

Figure 13:
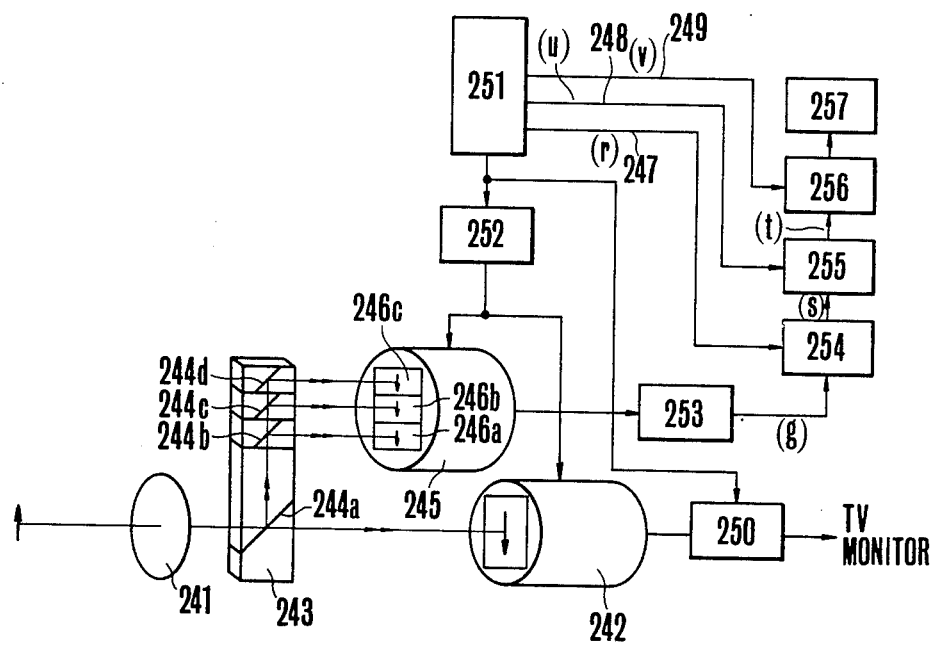
FIG. 13 shows an embodiment of the focus detecting system in accordance with the present invention applied to a TV camera.
Figure 14:
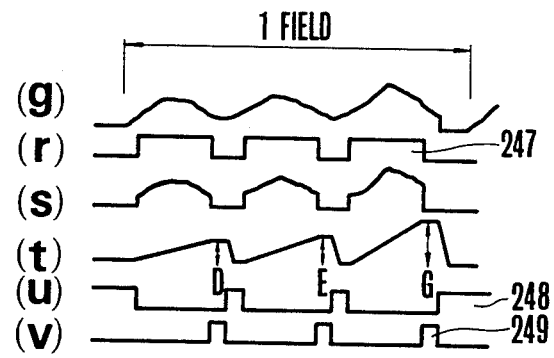
FIG. 14 shows the output signals of the important blocks in the composition shown in FIG. 13.

Lastly, FIG. 13 shows an embodiment of the focus detecting system in accordance with the present invention applied as a TV camera, while FIG. 14 shows the waveforms of the signals for one field, whereby (q)-(v) in FIG. 14 correspond to the signals on the signal lines having the same figures in FIG. 13.

In FIG. 13, the object light beam having passed through a picture taking lens 241 is divided into two with a first half permeable plane 224a of a prism 243, whereby the light beam having passed through the half permeable plane 224a is directed toward an image pick-up tube 242 for obtaining TV signals, while the light beam reflected on the half permeable plane 224a is divided at the ratio of 1 to 2 with a second half permeable plane 224b whose ratio of the reflection index to the permeability index is 1 to 2. The light beam having passed through the half permeable plane 244b is further divided at the ratio 1 to 1 with a third half permeable plane 244c whose ratio of the reflection index to the permeability index is 1 to 1, whereby the light beam having passed through the half permeable plane 224c is totally reflected on a totally reflecting plane 244d. The light beams reflected on the second and the third half permeable planes 244b and 244c and the totally reflecting plane 244d are, respectively, incident on three vertically divided image pick-up areas, 246a, 246b and 246c of an image pick-up tube 245 exclusively for focus detection. In this case, the distancesamong the second and the third half permeable planes 224b and 244c and the totally reflecting plane 244d of the prism 244 are so chosen that the image pick-up areas 246a, 246b and 246c of the image pick-up tube 246, respectively, and equivalently receive the image at the positions 108, 109 and 117 shown in FIG. 3. Together with the image pick-up tube 242 for TV signal, the image pick-up tube 245 for focus detection is scanned by a deflection circuit 252, controlled with a control circuit 251 in such a manner that along with scanning the signals from the image pick-up areas 246a, 246b and 246c are delivered to a linear amplifier circuit 253. A necessary range of the signals (FIG. 14(q)) amplified by the amplified circuit 253 is taken (FIG. 14(a)) out by a gate 254 controlled with the gate control signal (FIG. 14(r)) delivered from the control circuit 251 and, as mentioned above, delayed, subtracted, differentiated, squared and integrated in a processing circuit 255 (corresponding to the circuit blocks 165-169 shown in FIGS. 9 and 10). As to the integrating operation, the integration and the reset are repeated during the scanning for one field in accordance with the integration control signal 248 (FIG. 14(u)) delivered from the control circuit 251 so as to sample out the information corresponding to the image forming state at the positions 108, 109 and 117 shown in FIG. 3. The amounts of the sample values D, E and G at the positions 108, 109 and 117 are compared with one another by a calculating circuit 256, in accordance with the results of which a display circuit 257 displays the in-focus state, the near-focus state and the far-focus state. In this case, the calculating circuit 256 may be, as in the case of the embodiment shown in FIG. 9, so designed that each sample value is separately stored in the respective memory circuit, which delivers the output after the sampling termination at the position 117 or, as in the case of the embodiment shown in FIG. 10, so designed that the difference between the sample value and preceding sample value is obtained at every sampling so as to carry out the in-focus state judgment. Further, with respect to the display circuit 257, the composition of the embodiment shown in FIGS. 9 and 10 can be adopted without modification.

Further, the output of the image pick-up tube for a TV signal is, after the conventional processes such as γ compensation, the white compression, the black level clamp and so on by the process amplifier 250, taken out as a compound video signal. Further, in FIG. 14, (q) shows the output of the linear amplifier circuit 253, while (r) shows the gate control signal delivered from the control circuit 251 so as to control the gates 254, whereby when the level of the gate control signal is high, the gate 254 is in the closed state and the linear amplifier circuit 253 produces an output (q) so that the output of the gate 254 is as shown in (s). (t) shows the output of the integrating circuit in the process circuit 255, (u) the integration control circuit delivered from the control circuit 251 for controlling the process circuit 255 and (v) the sample control signal delivered from the control circuit 251 for the calculating circuit 256, whereby the sample values are stored while the level of the sample control signal is high.

As explained above, the focus detection system of the present invention is the one for carrying out the focus detection in accordance with the information of the image forming state at the two positions situated at an equal distance before and behind the pedetermined focal plane of the image forming optical system, whereby it is possible to discriminate the true in-focus state from the pseudo in-focus state, which has been so far impossible, and eliminate the mistaken focus detection, which is very advantageous for this kind of system.

What is claimed is:

1. A focus detecting system for detecting focus of an image forming optical system onto an object, said optical system having a predetermined focal plane, said detecting system comprising:
    (A) means for detecting imaging states of an object image formed by said optical system at first and second positions, each position being almost the same distance from the focal plane but substantially before and behind the focal plane, respectively, and a third position different from said first and second positions, said detecting means producing first, second and third signals corresponding to the imaging states respectively at the first, second and third positions; and
    (B) means for receiving the first, second and third signals produced from said detecting means and for judging the focusing condition of the optical system for the object on the basis of said first, second and third signals, and wherein said third position is further behind the second position behind the focal plane.

2. A focus detecting system according to claim 1, wherein said detecting means produces signals corresponding to image sharpness at the first, second and third positions as said first, second and third signals.

3. A focus detecting system according to claim 2, wherein said detecting means includes:
    a first, a second and a third image receiving element arranged so as to substantially correspond to the first, second, and third positions in order to respond to the variation of the image sharpness; and
    a first, a second and a third circuit means for respectively receiving the outputs of said first, second and third image receiving elements for producing said first, second and third signals in accordance with the outputs.

4. A focus detecting system according to claim 2, wherein said detecting means includes:
image receiving means being arranged at a position at which said receiving means can receive the image formed by the optical system;
imaging plane shift means being operable in such a manner that by selectively changing the imaging plane of the object image formed by the optical system, the image receiving means can receive the image formed by the optical system selectively and equivalently at the first, second and third positions; and
circuit means for receiving from the image receiving means first, second and third outputs obtained so as to correspond to the first, second and third positions by the operation of the imaging plane shift means to produce said first, second and third signals corresponding to the imaging states in accordance with said first, second and third outputs.

5. A focus detecting system according to claim 4, wherein said image receiving means includes scanning means for producing the image scanning signals corresponding to the brightness distribution of the object image by scanning the image, whereby said circuit means produces signals of the sharpness of the image at the first, second and third positions as said first, second and third signals corresponding to the imaging states in accordance with first, second and third image scanning signals obtained from the image scanning means so as to correspond to the first, second and third positions by the operation of the imaging plane shaft means.

6. A focus detecting system according to claim 4, wherein said imaging plane shift means is an optical path length variation means operable in such a manner that by selectively changing the length of the optical path between the image receiving means and the optical system, the image receiving means can receive the image formed by the optical system selectively and equivalently at said first, second and third positions.

7. A focus detecting system according to claim 2, wherein said detecting means includes:
image receiving means arranged at a position at which said receiving means can receive the image formed by the optical means, said image receiving means having first, second and third image receiving portions;
optical means arranged so as to make said first, second and third image receiving portions of said image receiving means correspond equivalently to said first, second and third positions; and
circuit means for receiving outputs from said first, second and third image receiving portions of said image receiving means so as to produce said first, second and third signal corresponding to the imaging states in accordance with the above outputs.

8. A focus detecting system according to claim 7, wherein said image receiving means is an image scanning means for producing image scanning signals corresponding to the brightness distribution of the image by scanning the image, whereby the circuit means produces signals corresponding to the sharpness of the images at said first, second and third positions as said first, second and third signals corresponding to the imaging states in accordance with the image scanning signals obtained from the first, second and third image receiving portions of the image scanning means.

9. A focus detecting system according to claim 1, wherein said judging means includes:
first circuit means for comparing said first, second and third signals produced from said detecting means with each other; and
second circuit means for judging the focusing condition of the optical system for the object on the basis of the comparison results produced from said first circuit means.

10. A focus detecting system according to claim 9, wherein said first circuit means includes:
a first circuit for comparing the first signal with the second signal,
a second circuit for comparing the second signal with the third signal; and
a third circuit for comparing the first signal with the third signal;
said second circuit means judging the focusing condition of the optical system for the object on the basis of the comparison results obtained from said first, second and third circuits.

11. A focus detecting system according to claim 1, wherein said judging means includes:
first circuit means for comparing said first and second signals produced from the detecting means;
second circuit means for comparing said second and third signals produced from the detecting means; and
third circuit means for judging the focusing conditions of the optical system for the object on the basis of the comparison results produced from said first and second circuit means.

12. In a focus detecting system for detecting focus of an image forming optical system onto an object, said optical system having an optical axis, an optical arrangement comprising in combination:
(A) radiation sensing means having first, second and third radiation sensitive portions arranged at different positions on the same plane; and
(B) a beam dividing member arranged between said image forming optical system and said radiation sensing means for causing said first, second and third radiation sensitive portions of the sensing means to, respectively, receive a radiation image of said object formed by the optical system at different first, second and third positions substantially and equivalently along the optical axis of the optical system.

13. An optical arrangement according to claim 12, wherein said first and second positions, respectively, correspond to positions each of which being almost at the same distance substantially before and behind a predetermined focal plane of said image forming optical system on the optical axis, while said third position corresponds to a position different from said two positions on the optical axis.

14. An optical arrangement according to claim 13, wherein said third position corresponds to the position further behind said second position corresponding to the position behind said focal plane on the optical axis.

15. In a focus detecting system for detecting focus of an image forming optical system onto an object, said optical system having an optical axis, an optical arrangement comprising in combination:

(A) radiation sensing means having first, second and third radiation sensitive portions arranged at different positions on the same plane; and (B) a beam dividing member for receiving image forming radiation from said image forming optical system and for dividing the received radiation into first, second and third positions of the image forming radiation which, respectively, have different path lengths to their respective imaging points from said optical system, said beam dividing member being arranged between the optical system and said radiation sensing means so as to direct the first, second and third radiation portions to said first, second and third radiation sensitive portions of the sensing means, respectively, for causing the first, second and third sensitive portions to respectively receive a radiation image of said object formed by the optical system at different first, second and third positions substantially and equivalently along the optical axis of the optical system.

16. An optical arrangement according to claim 15, wherein said first and second positions, respectively, correspond to positions each almost at the same distance substantially before and behind a predetermined focal plane of said image forming optical system on the optical axis, while said third position corresponds to a position different from said two positions on the optical axis.

17. An optical arrangement according to claim 16, wherein said third position corresponds to the position further behind said second position corresponding to the position behind said focal plane on the optical axis.

18. An optical arrangement for receiving image forming radiation coming from an image forming optical system, said arrangement comprising in combination:

(A) a beam dividing member for receiving said image forming radiation coming from said image forming optical system and for dividing the received radiation into a plurality of radiation components to form at least three images with differing path lengths to their respective imaging points from the image forming optical system; and (B) a plurality of radiation sensitive portions, each respectively for receiving said radiation components divided by said beam dividing member, said portions being arranged at different positions on a common plane.

19. A focus detecting system for detecting the focus of an image forming optical system onto an object, said optical system having a predetermined focal plane, said detecting system comprising:

(A) means for detecting imaging states of an object image formed by said optical system at a plurality of different positions including first and second positions, each position being almost the same distance from the focal plane but substantially before and behind the focal plane, respectively, and a third position further behind the second position behind the focal plane, said detecting means producing a plurality of signals corresponding to the imaging states respectively at said plurality of positions; and (B) means for receiving the signals produced from said detecting means and for judging the focusing condition of the optical system for the object on the basis of said signals.

20. A focus detecting system according to claim 19, wherein said detecting means produces as said signals, signals corresponding to image sharpness at said plurality of positions.

21. A focus detecting system according to claim 20, wherein said detecting means includes:

a plurality of image receiving elements arranged so as to substantially and respectively correspond to said positions in order to respond to the variation of the image sharpness; and circuit means for receiving outputs of said image receiving elements and for producing said signals on the basis of the outputs.

22. A focus detecting system according to claim 20, wherein said detecting means includes:

image receiving means arranged so as to receive the image formed by the optical system;

image plane shift means for selectively changing the image plane of the object image formed by the optical system relative to said image receiving means so that the image receiving means receives the image formed by the optical system selectively and equivalently at each of said plurality of positions; and circuit means for receiving outputs of said image receiving means respectively corresponding to said plurality of positions and for producing said signals.

23. A focus detecting system according to claim 22, wherein said image receiving means includes scanning means for producing an image scanning signal corresponding to the brightness distribution of the object image by scanning the image; and;

said circuit means producing said signals on the basis of the image scanning signals produced by the image scanning means and corresponding to said plurality of positions.

24. A focus detecting system according to claim 22, wherein said image forming plane shift means is an optical path length variation means operable in such a manner that, by selectively changing the length of the optical path between the image receiving means and the optical system, the image receiving means can receive the image formed by the optical system selectively and equivalently at each of said plurality of positions.

25. A focus detecting system according to claim 20, wherein said detecting means includes:

image receiving means arranged at a position at which said receiving means can receive the image formed by the optical means, said image receiving means having a plurality of image receiving portions;

optical means arranged so as to make each of said image receiving positions of said image receiving means correspond equivalently to each of said positions; and circuit means for receiving outputs from said image receiving portions of said image receiving means for producing said signals.

26. A focus detecting system according to claim 25, wherein said image receiving means is an image scanning means for producing an image scanning signal corresponding to the brightness distribution of the image by scanning the image, and said circuit means producing said signals on the basis of the image scanning signals produced by said image receiving portions of the image receiving means.

27. A focus detecting system for detecting focus of an image forming optical system onto an object, said optical system having a predetermined focal plane, said detecting system comprising:

(A) means for detecting imaging states of an object image formed by said optical system at first and second positions, each position being almost the same distance from the focal plane but substantially before and behind the focal plane, respectively, and a third position different from said first and second positions, said detecting means producing first, second and third signals corresponding to the imaging states respectively at the first, second and third positions; and (B) means for receiving the first, second and third signals produced from said detecting means and for judging the focusing condition of the optical system for the object on the basis of said first, second and third signals, said judging means including:

first circuit means for comparing said first, second and third signals produced from said detecting means with each other; and second circuit means for judging the focusing condition of the optical system for the object on the basis of the comparison results produced from said first circuit means.

28. A focus detecting system according to claim 27, wherein said first circuit means includes:

a first circuit for comparing the first signal with the second signal;

a second circuit for comparing the second signal with the third signal; and a third circuit for comparing the first signal with the third signal; said second circuit means judging the focusing condition of the optical system for the object on the basis of the comparison results obtained from said first, second and third circuits.

29. A focus detecting system according to claim 27 wherein said detecting means produces signals corresponding to image sharpness at the first, second and third positions as said first, second and third signals.

30. A focus detecting system according to claim 29, wherein said detecting means includes:

a first, a second and a third image receiving element arranged so as to substantially correspond to the first, second and third positions in order to respond to the variation of the image sharpness; and a first, a second and a third circuit means for respectively receiving the outputs of said first, second and third image receiving elements so as to produce said first, second and third signals in accordance with the outputs.

31. A focus detecting system according to claim 29, wherein said detecting means includes:

image receiving means being arranged at a position at which said receiving means can receive the image formed by the optical system;

imaging plane shift means being operable in such a manner that by selectively changing the imaging plane of the object image formed by the optical system, the image receiving means can receive the image formed by the optical system selectively and equivalently at the first, second and third positions; and circuit means for receiving from the image receiving means first, second and third outputs obtained so as to correspond to the first, second and third positions by the operation of the imaging plane shift means for producing said first, second and third signals corresponding to the imaging states in accordance with said first, second and third outputs.

32. A focus detecting system according to claim 31, wherein said image receiving means includes a scanning means for producing the image scanning signals corresponding to the brightness distribution of the object image by scanning the image, whereby said circuit means produces signals of the sharpness of the image at the first, second and third positions as said first, second and third signals corresponding to the imaging states in accordance with first, second and third image scanning signals obtained from the image scanning means so as to correspond to the first, second and third positions by the operation of the imaging plane shift means.

33. A focus detecting system according to claim 29 wherein said imaging plane shift means is an optical path length variation means operable in such a manner that by selectively changing the length of the optical path between the image receiving means and the optical system, the image receiving means can receive the image formed by the optical system selectively and equivalently at said first, second and third positions.

34. A focus detecting system according to claim 29, wherein said detecting means includes:

image receiving means arranged at a position at which said receiving means can receive the image formed by the optical means, said image receiving means having first, second and third image receiving portions;

optical means arranged so as to make said first, second and third image receiving portions of said image receiving means correspond equivalently to said first, second and third positions; and circuit means for receiving outputs from said first, second and third image receiving portions of said image receiving means for producing said first, second and third signals corresponding to the imaging states in accordance with the outputs.

35. A focus detecting system according to claim 34, wherein said image receiving means is an image scanning means for producing image scanning signals corresponding to the brightness distribution of the image by scanning the image, whereby the circuit means produces signals corresponding to the sharpness of the images at said first, second and third positions as said first, second and third signals corresponding to the imaging states in accordance with the image scanning signals obtained from the first, second and third image receiving portions of the image scanning means.

36. A focus detecting system according to claim 29, wherein said third position is further behind the second position behind the focal plane.

37. A focus detecting system for detecting focus of an image forming optical system onto an object, said optical system having a predetermined focal plane, said detecting system comprising:

(A) means for detecting imaging states of an object image formed by said optical system at first and second positions, each position being almost the same distance from the focal plane but substantially before and behind the focal plane, respectively, and a third position different from said first and second positions, said detecting means producing first, second and third signals corresponding to the imaging states respectively at the first, second and third positions; and (B) means for receiving the first, second and third signals produced from said detecting means and for judging the focusing condition of the optical system for the object on the basis of said first, second and third signals, said judging means including circuit means for discriminating whether the difference value between said first and second signals is above a predetermined value and comparing said third signal with each of the first and second signals and for producing an output indicative of the focusing condition of the optical system for the object on the basis of the results of said discrimination and comparison.

38. A focus detecting system for detecting focus of an image forming optical system onto an object, said optical system having a predetermined focal plane, said detecting system comprising:
(A) means for detecting imaging states of an object image formed by said optical system at first and second positions, each position being almost the same distance from the focal plane but substantially before and behind the focal plane, respectively, and a third position different from said first and second positions, said detecting means producing first, second and third signals corresponding to the imaging states, respectively, at the first, second and third positions; and
(B) means for receiving the first, second and third signals produced from said detecting means and for judging the focusing condition of the optical system for the object on the basis of said first, second and third signals, said judging means including circuit means for forming a first discrimination signal on the basis of said first and second signals, a second discrimination signal on the basis of said second and third signals and a third discrimination signal on the basis of said first and third signals and for producing an output indicative of the focusing condition of the optical system for the object on the basis of said first, second and third discrimination signals.

39. A focus detecting system for detecting focusing condition of an image forming optical system for an object, said optical system having a predetermined focal plane, said detecting system comprising:
(A) means for detecting imaging states of an object image formed by said optical system at first and second positions, each position being almost the same distance from the focal plane but substantially before and behind the focal plane, respectively, and a third position different from said first and second positions, said detecting means producing first, second and third signals corresponding to the imaging states respectively at the first, second and third positions; and
(B) means for receiving the first, second and third signals produced from said detecting means and for judging the focusing condition of the optical system for the object on the basis of said first, second and third signals, said judging means including circuit means for forming a fourth signal on the basis of said first and second signals and for discriminating the focusing condition of the optical system for the object on the basis of said third and fourth signals.

* * * * *